(12) United States Patent
Ristovski et al.

(10) Patent No.: US 9,388,932 B2
(45) Date of Patent: Jul. 12, 2016

(54) AUTOMOTIVE SELECTIVE CATALYTIC REDUCTION (SCR) SYSTEM SENSOR HOLDER AND ASSEMBLY

(71) Applicant: Norma U.S. Holding LLC, Auburn Hills, MI (US)

(72) Inventors: Borce Ristovski, Tecumseh (CA); David Robert Burghart, Ann Arbor, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 407 days.

(21) Appl. No.: 13/780,924

(22) Filed: Feb. 28, 2013

(65) Prior Publication Data

US 2013/0220467 A1  Aug. 29, 2013

Related U.S. Application Data

(60) Provisional application No. 61/604,379, filed on Feb. 28, 2012.

(51) Int. Cl.
| | |
|---|---|
| *F01N 11/00* | (2006.01) |
| *F16L 55/00* | (2006.01) |
| *F01N 3/20* | (2006.01) |
| *F16L 37/14* | (2006.01) |

(52) U.S. Cl.
CPC ............. *F16L 55/00* (2013.01); *F01N 3/208* (2013.01); *F16L 37/144* (2013.01); *F01N 2610/02* (2013.01); *F01N 2610/14* (2013.01); *F01N 2610/148* (2013.01); *F01N 2610/1486* (2013.01); *F01N 2900/1806* (2013.01); *Y02T 10/24* (2013.01)

(58) Field of Classification Search
USPC .............................................. 73/431; 138/104
See application file for complete search history.

(56) References Cited

U.S. PATENT DOCUMENTS

| | | | |
|---|---|---|---|
| 4,815,769 A | | 3/1989 | Hopperdietzel |
| 5,000,614 A | * | 3/1991 | Walker et al. ................. 403/326 |
| 5,605,360 A | † | 2/1997 | Kurisaki |
| 5,693,887 A | † | 12/1997 | Englund |

(Continued)

FOREIGN PATENT DOCUMENTS

| | | |
|---|---|---|
| CN | 101606014 | 12/2009 |
| DE | 19902431 | 8/2000 |

(Continued)

OTHER PUBLICATIONS

International Search Report for PCT/US2013/028326, Jun. 24, 2013, 4 pages.

(Continued)

*Primary Examiner* — Lisa Caputo
*Assistant Examiner* — Jamel Williams
(74) *Attorney, Agent, or Firm* — Harness, Dickey & Pierce, P.L.C.

(57) ABSTRACT

An automotive selective catalytic reduction (SCR) system assembly includes a holder for receiving an SCR system sensor. The holder has a tube, a chamber, and a retainer. The tube receives incoming fluid from a first SCR line and leads exiting fluid to a second SCR line. A passage is located in the tube. The chamber has a interior for receiving the SCR system sensor, and has an opening. The retainer has a portion moveable in and out of the chamber's opening for holding and releasing the SCR system sensor in the chamber's interior.

19 Claims, 3 Drawing Sheets

(56) References Cited

U.S. PATENT DOCUMENTS

| | | | |
|---|---|---|---|
| 5,869,766 A * | 2/1999 | Cucci | G01L 9/0075 73/706 |
| 6,363,771 B1 | 4/2002 | Liang et al. | |
| 6,892,706 B2 * | 5/2005 | Kienzler et al. | 123/468 |
| 7,437,925 B2 | 10/2008 | Ban et al. | |
| 2003/0094813 A1 | 5/2003 | Bucher et al. | |
| 2004/0050168 A1 † | 3/2004 | Uberreiter | |
| 2004/0178629 A1 * | 9/2004 | Yoshida | 285/305 |
| 2004/0244511 A1 † | 12/2004 | Hueftle | |
| 2004/0250629 A1 | 12/2004 | Turner et al. | |
| 2005/0083638 A1 | 4/2005 | Warren et al. | |
| 2005/0092460 A1 † | 5/2005 | Darby | |
| 2005/0175066 A1 † | 8/2005 | Nakabayashi | |
| 2006/0150729 A1 † | 7/2006 | Nestle | |
| 2006/0251548 A1 * | 11/2006 | Willey et al. | 422/180 |
| 2007/0056365 A1 † | 3/2007 | Stahlmann | |
| 2007/0062306 A1 † | 3/2007 | Morrison | |
| 2007/0187869 A1 * | 8/2007 | Bierslaker | B29C 45/14073 264/265 |
| 2008/0277929 A1 | 11/2008 | Bucher et al. | |
| 2008/0314027 A1 * | 12/2008 | Barber et al. | 60/286 |
| 2009/0301059 A1 | 12/2009 | Toshioka et al. | |
| 2010/0065013 A1 | 3/2010 | Weber et al. | |
| 2010/0263740 A1 † | 10/2010 | Borgmeier | |
| 2010/0290764 A1 | 11/2010 | Borgmeier et al. | |
| 2011/0006513 A1 † | 1/2011 | Lechner | |
| 2011/0148096 A1 † | 6/2011 | Engle | |
| 2012/0100735 A1 † | 4/2012 | Rosenfeldt | |
| 2013/0213013 A1 * | 8/2013 | Mitchell et al. | 60/276 |
| 2013/0336643 A1 † | 12/2013 | Borgmeier | |
| 2014/0020364 A1 * | 1/2014 | Wittrock et al. | 60/274 |
| 2014/0301899 A1 * | 10/2014 | Nakatani | 422/94 |

FOREIGN PATENT DOCUMENTS

| | | | |
|---|---|---|---|
| DE | 199 61 287 | 6/2001 | |
| DE | 10255267 A1 † | 6/2004 | |
| DE | 202006003590 | 6/2006 | |
| EP | 1705417 | 9/2006 | |
| EP | 1710484 | 10/2006 | |
| EP | 1 985 908 | 10/2008 | |
| EP | 2154490 A1 † | 2/2010 | |
| EP | 2 339 306 | 6/2011 | |
| FR | 2637021 A1 † | 3/1990 | |
| FR | 2802587 A1 † | 6/2001 | |
| FR | 2864700 A1 † | 7/2005 | |
| JP | 08219352 | 8/1996 | |
| JP | H11118647 A † | 4/1999 | |
| JP | 11325361 | 11/1999 | |
| JP | 11325361 A * | 11/1999 | F16L 37/12 |
| JP | 2001141158 | 5/2001 | |
| JP | 3202942 B2 | 8/2001 | |
| JP | 2004125035 | 4/2004 | |
| JP | 2005180687 | 7/2005 | |
| JP | 2006183764 | 7/2006 | |
| WO | WO2007032034 | 3/2007 | |
| WO | WO2007073286 | 6/2007 | |
| WO | WO2008023021 | 2/2008 | |
| WO | WO2008/071022 | 6/2008 | |
| WO | WO2008105726 A1 | 9/2008 | |
| WO | WO2008/131993 | 11/2008 | |
| WO | WO2011/055295 | 5/2011 | |

OTHER PUBLICATIONS

Written Opinion for PCT/US2013/028326, Jun. 24, 2013, 5 pages.
International Search Report for PCT/US2011/035267, Feb. 8, 2012, 3 pages.
International Search Report for PCT/US2011/035269, Feb. 8, 2012, 3 pages.
Written Opinion for PCT/US2011/035267, Feb. 8, 2012, 4 pages.
Written Opinion for PCT/US2011/035269, Feb. 8, 2012, 4 pages.

\* cited by examiner
† cited by third party

AUTOMOTIVE SELECTIVE CATALYTIC REDUCTION (SCR) SYSTEM SENSOR HOLDER AND ASSEMBLY

CROSS-REFERENCE TO RELATED APPLICATION

This application claims the benefit of U.S. Provisional Patent Application No. 61/604,379, filed Feb. 28, 2012, the entire contents of which are hereby incorporated by reference.

TECHNICAL FIELD

The present disclosure relates to automotive selective catalytic reduction (SCR) systems, and more particularly to using sensors in SCR line assemblies.

BACKGROUND

Automobiles with diesel engines are often equipped with a selective catalytic reduction (SCR) exhaust treatment system used to reduce the amount of nitrogen oxide ($NO_x$) in the engine's exhaust. Generally, in an SCR system, a reducing agent such as urea or diesel exhaust fluid (DEF) is injected into the engine's exhaust stream to cause a chemical reaction that converts $NO_x$ into nitrogen and water. Sensors, such as urea quality sensors, are sometimes installed in SCR system tanks to sense properties of the reducing agent held in the tanks. One challenge encountered when using urea or DEF as the reducing agent is that it freezes at around −11° C., and therefore it can be difficult to sense its properties in cold climates when stored in the tanks.

SUMMARY

In accordance with an aspect of the invention, there is provided an automotive selective catalytic reduction (SCR) system sensor holder. The holder includes a tube, a chamber, and a retainer. The tube has an inlet to receive incoming fluid from a first SCR line, and has an outlet to lead exiting fluid to a second SCR line. The tube also has a passage extending between the inlet and outlet. The chamber has an interior accessible to the passage for receiving an SCR system sensor. The chamber has an opening leading to the interior. The retainer has a portion moveable in the chamber's opening. Upon movement of the portion in the opening toward the interior, the portion abuts the SCR system sensor and holds the sensor in the holder. And upon movement of the portion away from the interior, the SCR system sensor can be released out of the holder.

In accordance with another aspect of the invention, there is provided an automotive selective catalytic reduction (SCR) system assembly. The assembly includes a holder, an inlet connector, an outlet connector, a first SCR line, and a second SCR line. The holder includes a tube, a chamber, and a heating element. The tube has an inlet, an outlet, and a passage extending between the inlet and outlet. The chamber has an interior accessible to the passage, and the interior receives the SCR system sensor. The heating element emits heat to a section or more of the tube. The inlet connector is inserted within the inlet of the tube, while the outlet connector is inserted within the tube's outlet. The first SCR line is connected to the inlet connector, and the second SCR line is connected to the outlet connector.

In accordance with yet another aspect of the invention, there is provided an automotive selective catalytic reduction (SCR) system sensor holder. The holder includes a tube, a chamber, a resistance wire, a first retainer, a second retainer, and a third retainer. The tube has an inlet to receive incoming fluid from a first SCR line, has an outlet to lead exiting fluid to a second SCR line, and has a passage extending between the inlet and outlet. The inlet has a first opening leading to the passage, and the outlet has a second opening leading the passage. The chamber has an interior accessible to the passage. The interior receives an SCR system sensor. The chamber has an open bottom open to the passage of the tube in order to receive a portion of the SCR system sensor in the passage. The chamber further has a third opening leading to the interior. The resistance wire is located around a section or more of the tube in order to emit heat to the tube. The first retainer has a portion that can be moved in the first opening, the second retainer has a portion that can be moved in the second opening, and the third retainer has a portion that can be moved in the third opening.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 1:
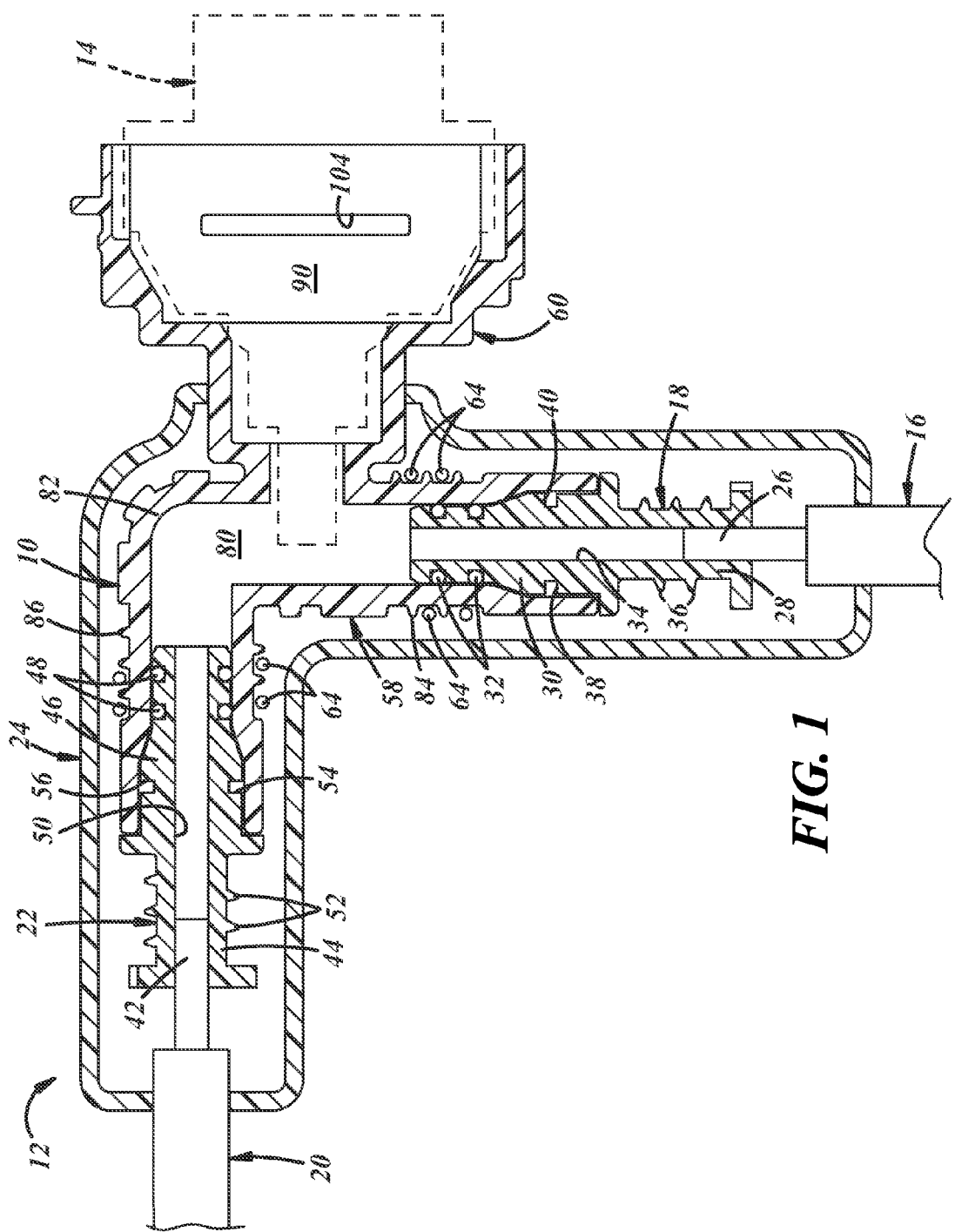
FIG. 1 is a cross-sectional view of one embodiment of an automotive selective catalytic reduction (SCR) system assembly.

Referring to the drawings, FIGS. 1-5 show an embodiment of an automotive selective catalytic reduction (SCR) system sensor holder 10—also called a sensor manifold—that is used in an SCR exhaust treatment system assembly 12. The sensor holder 10 can have quick-connect functionality so that a sensor 14, such as a urea quality sensor, can be more readily inserted into and held in the sensor holder, and released and removed from the sensor holder for service and replacement. The sensor holder 10 is placed in-line (feed or return line) in the SCR system assembly 12 downstream of an SCR system tank and upstream of an SCR system dosing injector, which can facilitate retrofitting in SCR system assemblies and can reduce complexity compared to known installations in the SCR system tanks. For use in cold climates, one or more resistance wires can be placed around the sensor holder 10 in order to emit heat to a reducing agent such as urea passing through the holder. Though described in the context of urea as a reducing agent and with a urea quality sensor, the sensor holder 10 can be used with other reducing agents and with other types of sensors.

The SCR system assembly 12 carries pressurized urea fluid at least part way between a urea tank and a urea dosing injector. The SCR system assembly 12 can have different designs, constructions, and components, depending upon, among other considerations, its particular vehicle application. In the embodiment of FIG. 1, for example, the SCR system assembly 12 includes the sensor holder 10, a first SCR line 16, an inlet connector 18, a second SCR line 20, an outlet connector 22, and a cover 24. The first SCR line 16, or urea line, carries urea fluid from the urea tank and to the sensor holder 10. At its end opposite the sensor holder 10, the first SCR line 16 can be fitted with a coupling to facilitate its connection to the urea tank Along its axial and longitudinal extent, the first SCR line 16 can have one or more resistance wires wound or otherwise placed at its exterior surface in order to emit heat via resistive heating to the urea fluid passing therethrough. At a terminal end 26, the first SCR line 16 is connected to the inlet connector 18. Still referring to FIG. 1, the inlet connector 18 facilitates fluid-tight connection between the first SCR line 16 and the sensor holder 10. The first SCR line 16 is inserted tightly (e.g., press-fit) into a first end 28, and a second end 30 of the inlet connector 18 is inserted into the sensor holder 10. The second end 30 can have a ramped portion, and gaskets 32 can be provided for sealing. For carrying urea fluid from the first SCR line 16 to the sensor holder 10, a passage 34 extends between the first and second ends 28, 30. Furthermore, the inlet connector 18 can have one or more ribs 36 extending from its exterior surface in order to support placement of one or more optional resistance wires, and the inlet connector can have a first groove 38 and a second groove 40 in order to receive insertion of an inlet retainer as described below.

Similarly, the second SCR line 20, or urea line, carries urea fluid from the sensor holder 10 and to the dosing injector. At its end opposite the sensor holder 10, the second SCR line 20 can be fitted with a coupling to facilitate its connection to the dosing injector. Along its axial and longitudinal extent, the second SCR line 20 can have one or more resistance wires wound or otherwise placed at its exterior surface in order to emit heat via resistive heating to the urea fluid passing therethrough. At a terminal end 42, the second SCR line 20 is connected to the outlet connector 22. The outlet connector 22 facilitates fluid-tight connection between the second SCR line 20 and the sensor holder 10. The second SCR line 20 is inserted tightly (e.g., press-fit) into a first end 44, and a second end 46 of the outlet connector 22 is inserted into the sensor holder 10. The second end 46 can have a ramped portion, and gaskets 48 can be provided for sealing. For carrying urea fluid from the sensor holder 10 to the second SCR line 20, a passage 50 extends between the first and second ends 44, 46. Furthermore, the outlet connector 22 can have one or more ribs 52 extending from its exterior surface in order to support placement of one or more optional resistance wires, and the outlet connector can have a first groove 54 and a second groove 56 in order to receive insertion of an outlet retainer as described below. And, still referring to FIG. 1, the cover 24 encloses and protects a part of the sensor holder 10, all of the inlet connector 18, and all of the outlet connector 22. The cover 24 also encloses and protects the terminal end 26 of the first SCR line 16 and the terminal end 42 of the second SCR line 20. For flexibility, the cover 24 can be made of rubber or another flexible material.

Figure 3:
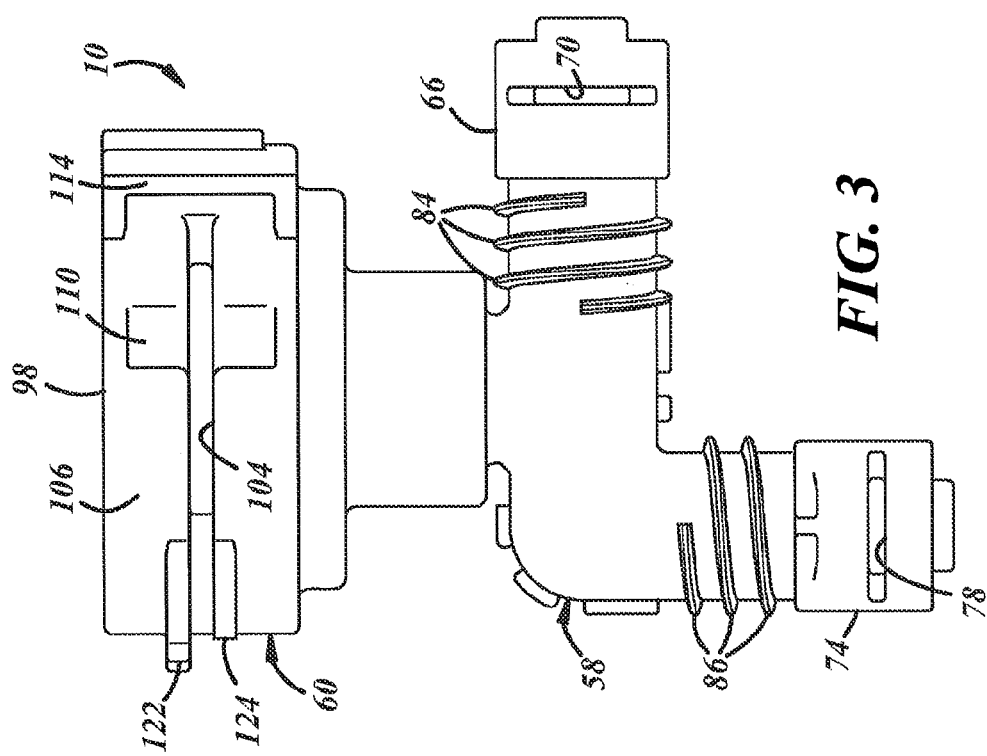
FIG. 3 is a side view of the SCR system sensor holder of FIG. 2.
Figure 2:
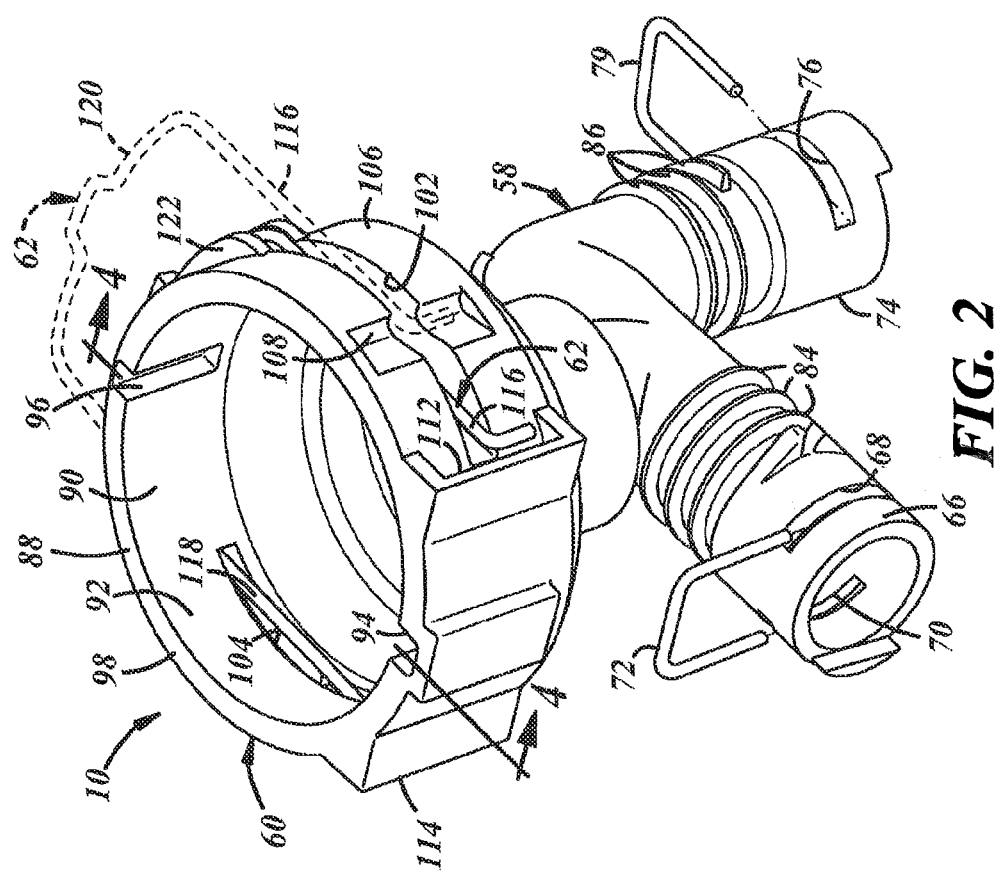
FIG. 2 is a perspective view of one embodiment of an automotive SCR system sensor holder that can be used with the SCR system assembly of FIG. 1.
Figure 4:
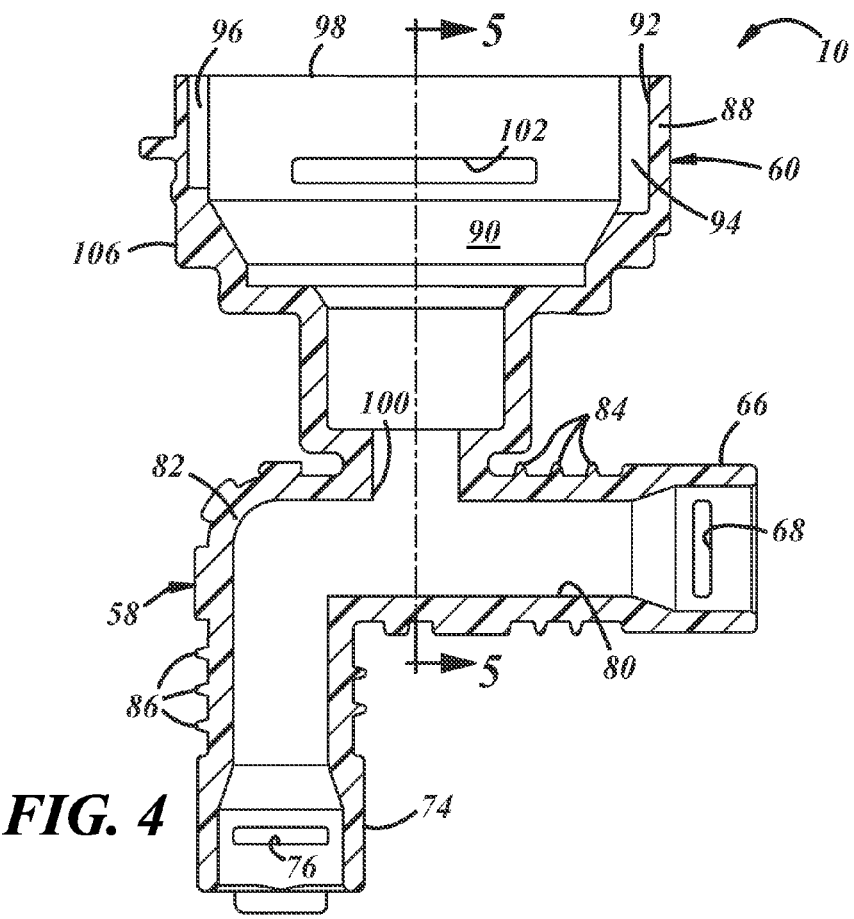
FIG. 4 is a cross-sectional view of the SCR system sensor holder taken at line 4-4 in FIG. 2.
Figure 5:
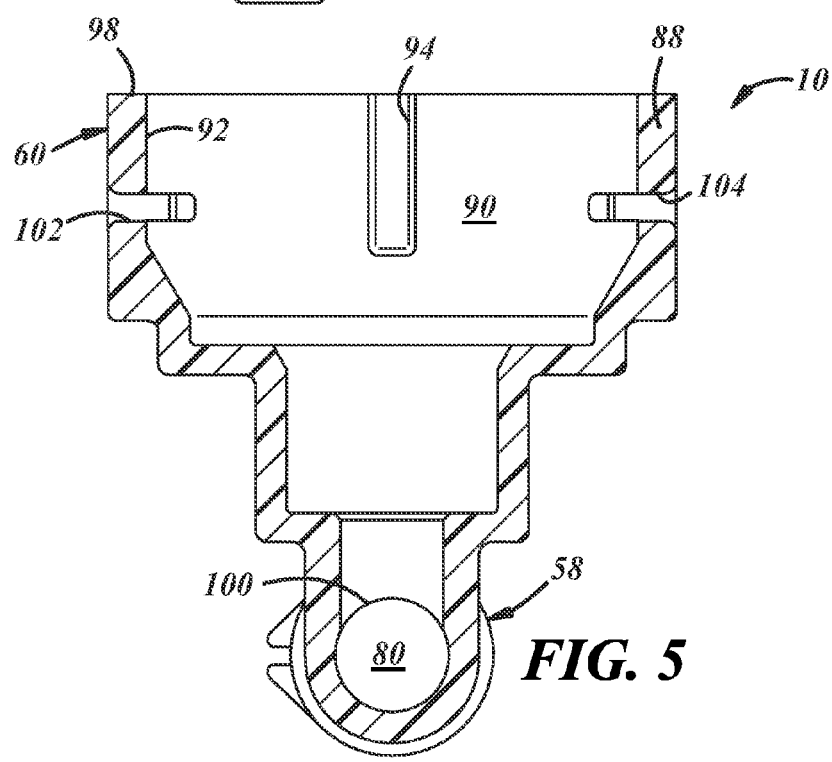
FIG. 5 is a cross-sectional view of the SCR system sensor holder taken at line 5-5 in FIG. 4.

The SCR system sensor holder 10 connects to the first and second SCR lines 16, 20, and holds the urea quality sensor 14 in position to measure the quality of the urea fluid passing through the sensor holder and between the first and second SCR lines. The sensor holder 10 can have different designs, constructions, and components, depending upon, among other considerations, its location in the SCR system assembly 12 and the type and construction of the sensor 14. In the embodiment of FIGS. 1-5, the sensor holder 10 can be a one-piece body made of a plastic material such as PA12 GF50, and the sensor holder includes a tube 58, a chamber 60, a retainer 62, and one or more resistance wires 64. Referring to FIGS. 2-4, the tube 58 has an inlet 66 that receives insertion of the inlet connector 18 and that has a diametrically-reduced portion to complement the ramped portion of the inlet connector. The inlet 66 has a first opening 68 and a second opening 70 defined in a wall thereof for receiving portions of an inlet retainer 72—in particular, for respectively receiving first and second legs of the inlet retainer. Once moved through the first and second openings 68, 70, the first and second legs are respectively received in the first and second grooves 38, 40 of the inlet connector 18. The legs, openings 68 and 70, grooves 38 and 40, and the interaction among them, provide a quick-connect functionality between the sensor holder 10 and the inlet connector 18. For a more permanent connection, a molding material can be overmolded onto the inlet 66 at the legs, openings 68 and 70, and grooves 38 and 40.

Similarly, the tube 58 has an outlet 74 that receives insertion of the outlet connector 22 and that has a diametrically-reduced portion to complement the ramped portion of the outlet connector. The outlet 74 has a first opening 76 and a second opening 78 defined in a wall thereof for receiving portions of an outlet retainer 79—in particular, for respectively receiving first and second legs of the outlet retainer. Once moved through the first and second openings 76, 78, the first and second legs are respectively received in the first and second grooves 54, 56 of the outlet connector 22. The legs, openings 76 and 78, grooves 54 and 56, and the interaction among them, provide a quick-connect functionality between the sensor holder 10 and the outlet connector 22. For a more permanent connection, a molding material can be overmolded onto the outlet 74 at the legs, openings 76 and 78, and grooves 54 and 56.

Referring to FIGS. 1 and 4, a passage 80 of the tube 58 extends between the inlet 66 and the outlet 74, and carries urea fluid therebetween. The passage 80 fluidly communicates directly with the passages 34, 50 of the inlet and outlet connectors 18, 22. As shown in FIG. 1, the passage 80 is open to, and accessible with, the chamber 60 so that a measuring tip of the urea quality sensor 14 can be suspended and introduced into the passing urea fluid in order to take measurements or otherwise sense properties of the urea fluid. In the embodiment of the figures, the tube 58 has an approximately perpendicular bend 82 formed in its longitudinal extent. The bend 82 is located downstream of the location where the passage 80 is open to the chamber 60. Referring now to FIGS. 1-4, the tube 58 can have a first rib 84 and a second rib 86 to support placement of the resistance wires 64. The first rib 84 can be a continuous helical extension extending circumferentially around an exterior surface of the tube 58 adjacent the inlet 66, or can have another structure and arrangement. Likewise, the second rib 86 is a continuous helical extension extending circumferentially around the exterior surface of the tube 58 adjacent the outlet 74, or can have another structure and arrangement.

The chamber 60 receives insertion of the urea quality sensor 14. The chamber 60 can have different designs, constructions, and components, depending upon, among other considerations, the type and construction of the sensor 14. In the embodiment of FIGS. 1-5, the chamber 60 has a chamber wall 88 that defines an interior 90. The interior 90 provides a space to accommodate insertion of the urea quality sensor 14 and to complement the shape of the sensor, and therefore can provide different spaces and shapes for different sensors. The chamber wall 88 has an interior surface 92 with a series of diametrically-reduced sections for suitably seating the urea quality sensor 14. To help guide and pilot the urea quality sensor 14 in the chamber 60, a first and second slot 94, 96 are provided at the interior surface 92 and receive a complementarily portion or structure of the sensor. The chamber 60 has an open top 98, and has an open bottom 100 that is open to, and accessible with, the passage 80 of the tube 58 so that the measuring tip of the urea quality sensor 14 can be suspended and introduced into the passing urea fluid (shown in FIG. 1). Furthermore, a first and second opening 102, 104 are defined in the chamber wall 88 and extend completely through the chamber wall and lead to the interior 90. The first and second openings 102, 104 interact with the retainer 62 to provide a quick-connect functionality between the sensor holder 10 and the urea quality sensor 14, as described in more detail below. And, at an exterior surface 106, a first and second recess 108, 110 are provided for seating the retainer 62, and a first and second cover 112, 114 are provided for concealing a portion of the retainer.

The retainer 62 interacts with the chamber 60 to provide a quick-connect functionality so that the urea quality sensor 14 is readily inserted into and held in the sensor holder 10, and can be subsequently released and removed from the sensor holder for service and replacement. The retainer 62 can have different designs, constructions, and components, depending upon, among other considerations, the construction and design of the chamber 60 and the type and construction of the sensor 14. In the embodiment of FIG. 2, the retainer 62 is a one-piece stainless steel wire spring that is inwardly biased and that has a first leg 116, a second leg 118, and a bridge 120 extending therebetween. The first and second legs 116, 118 can be substantially similar in shape and size. In a first position in use, the retainer 62 is somewhat loosely carried by the chamber 60 with an end portion of the first leg 116 seated in the first recess 108, and an end portion of the second leg 118 seated in the second recess 110 (shown by phantom in FIG. 2). Here, the bridge 120 is externally serviceable and accessible by a user, and the first and second legs 116, 118 are located outside of the interior 90 and outside of the first and second openings 102, 104.

To be brought to a second position, the bridge 120 can be moved toward the interior 90 and toward the exterior surface 106 where the bridge can abut against the exterior surface between a pair of flanges 122, 124. The flanges 122, 124 help prevent inadvertent dislodging of the bridge 120 when the retainer 62 is in the second position. Concurrently, the first and second legs 116, 118 are moved toward the interior 90 and bear against the exterior surface 106 as the legs are slid thereover in movement. The first and second legs 116, 118 are moved respectively through the first and second openings 102, 104 and into the interior 90 (shown by solid line in FIG. 2). Here, the end portions of the first and second legs 116, 118 are respectively located generally underneath the first and second covers 112, 114. The legs 116, 118 and openings 102, 104 provide the quick-connect functionality. For example, to insert the urea quality sensor 14 into the sensor holder 10, the retainer 62 is brought to the first position and the sensor can be placed inside of the chamber 60. To hold the urea quality sensor 14 in the chamber 60, the retainer 62 is brought to the second position and the first and second legs 116, 118 are moved through the first and second openings 102, 104 and into recesses or against edged portions of the sensor. The urea quality sensor 14 is thereby secured within the sensor holder 10 and prevented from being removed out of the chamber 60. A tight fit with one or more gaskets can be provided between the urea quality sensor 14 and the chamber 60 so that no other connection techniques are needed apart from the retainer 62. And conversely, to release the urea quality sensor 14 out of the sensor holder 10, the retainer 62 is brought back to the first position and the sensor can be removed out of the chamber 60.

The resistance wires 64 emit a suitable amount of heat via resistive heating directly to the tube 58 and thereby indirectly to the urea fluid passing through the tube. The heat helps ensure that the urea fluid reaches a proper temperature for flow through the tube 58 and for measurements and sensing by the urea quality sensor 14. In the embodiment of FIG. 1, the resistance wires 64 can be copper wires wound about the tube 58 and around the first and second ribs 84, 86. The resistance wires 64 can be a single wire wound around both of the first and second ribs 84, 86, or can be separate and distinct wires wound around the first and second ribs. For providing electrical current to the resistance wires 64 and to thereby generate heat, the wires can be electrically coupled to an electronic control unit (ECU) such as an automobile control unit, or to another device. This description of the resistance wires also applies to the previously-mentioned resistance wires of the first SCR line 16, resistance wires of the inlet connector 18, resistance wires of the second SCR line 20, and resistance wires of the outlet connector 22.

In other embodiments not shown in the figures, the SCR system assembly 12 and the SCR system sensor holder 10 can have different designs, constructions, and components. For example, the tube of the sensor holder need not have a bend and instead could be uni-directional or could have a T-shape with a total of three inlet(s) and outlet(s); the resistance wires need not be provided for the sensor holder, or the heat emitting functionality could be provided by heating elements other than the resistance wires; the quick-connect functionality between the chamber and the retainer could be provided in different ways including ways without the retainer, such as a quick-connection with an inter-connecting or inter-engaging structure that engages the valve or that is received in a recess of the valve, with a quick-connection having a recess to receive a structure or portion of the valve, or with a quick-connection interlocking with a snap-fit motion or with a twist-lock motion; and likewise, the quick-connect functionality between the inlet and outlet of the tube and the respective inlet and outlet connectors need not be provided, or could be provided in another way such as by the ways described immediately above.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An automotive selective catalytic reduction (SCR) system sensor holder, the holder comprising:

a tube having an inlet to receive incoming fluid from a first SCR line, having an outlet to lead exiting fluid to a second SCR line, and having a passage between said inlet and said outlet;

a chamber having an interior accessible to said passage, said interior designed to receive an SCR system sensor, said chamber having an opening leading to said interior such that the SCR system sensor extends through the opening directly into the passage between the inlet and outlet; and a retainer having a portion moveable in said opening of said chamber, wherein, when said portion is moved in said opening toward said interior, said portion abuts the SCR system sensor and holds the SCR system sensor in the automotive SCR system sensor holder, and wherein, when said portion is moved away from said interior, the SCR system sensor is releasable out of the automotive SCR system sensor holder.

2. An automotive SCR system sensor holder as defined in claim 1, wherein said inlet has an opening leading to said passage, said outlet has an opening leading to said passage, the automotive SCR system sensor holder further comprising an inlet retainer having a portion moveable in said opening of said inlet, and the automotive SCR system sensor holder further comprising an outlet retainer having a portion moveable in said opening of said outlet.

3. An automotive SCR system sensor holder as defined in claim 2, further comprising an inlet connector to receive incoming fluid from the first SCR line, said inlet connector being inserted within said inlet of said tube, and further comprising an outlet connector to lead exiting fluid to the second SCR line, said outlet connector being inserted within said outlet of said tube, said inlet connector having a groove and said outlet connector having a groove, wherein, when said inlet connector is inserted within said inlet of said tube, said portion of said inlet retainer is moved in said opening of said inlet and said portion of said inlet retainer is received in said groove of said inlet connector to secure said inlet retainer within said inlet of said tube, and wherein, when said outlet connector is inserted within said outlet of said tube, said portion of said outlet retainer is moved in said opening of said outlet and said portion of said outlet retainer is received in said groove of said outlet connector to secure said outlet retainer within said outlet of said tube.

4. An automotive SCR system sensor holder as defined in claim 1, wherein said passage has a bend located along its extent between said inlet and said outlet, and said interior of said chamber is accessible to said passage at a location upstream of said bend with respect to fluid-flow through said passage.

5. An automotive SCR system sensor holder as defined in claim 1, wherein at least one of said inlet or said outlet has at least one rib to support at least one resistance wire wound thereabout.

6. An automotive SCR system sensor holder as defined in claim 1, wherein said chamber has an open top leading to said interior in order to receive the SCR system sensor.

7. An automotive SCR system sensor holder as defined in claim 1, wherein said chamber has an open bottom that is open to said passage of said tube in order to receive a portion of the SCR system sensor in said passage.

8. An automotive SCR system sensor holder as defined in claim 1, wherein said chamber has a recess located in an exterior surface thereof, and said retainer has an end portion, said end portion being seated in said recess before said portion of said retainer is moved in said opening toward said interior.

9. An automotive SCR system sensor holder as defined in claim 1, wherein said opening includes a first opening leading to said interior and includes a second opening leading to said interior, said retainer being a wire spring with a first leg and a second leg, said first leg and said second leg constituting said portion of said retainer, wherein, when said first leg is moved in said first opening toward said interior and said second leg is moved in said second opening toward said interior, said first and second legs abut the SCR system sensor and hold the SCR system sensor in the automotive SCR system sensor holder, and wherein, when said first and second legs are moved away from said interior, the SCR system sensor is releasable out of the automotive SCR system sensor holder.

10. An automotive SCR system sensor holder as defined in claim 9, wherein said wire spring has a bridge extending between said first and second legs, said bridge located outside of said interior of said chamber and externally serviceable by a user when said wire spring is carried by said chamber.

11. An automotive SCR system sensor holder as defined in claim 1, wherein said chamber has a cover extending from an exterior surface thereof, and said retainer has an end portion, said end portion being located generally underneath said cover after said portion of said retainer is moved in said opening toward said interior.

12. An automotive SCR system sensor holder as defined in claim 1, further comprising at least one resistance wire around at least a section of said tube in order to emit heat to said tube.

13. An automotive SCR system sensor holder as defined in claim 1, wherein the SCR system sensor is a urea quality sensor.

14. An automotive selective catalytic reduction (SCR) system assembly, the assembly comprising:

a holder comprising a tube, a chamber, and a heating element, said tube having an inlet, an outlet, and a passage between said inlet and said outlet, said chamber having an interior accessible to said passage, said interior receiving an SCR system sensor, said heating element emitting heat to at least a section of said tube;

an inlet connector inserted within said inlet of said tube;

an outlet connector inserted within said outlet of said tube;

a first SCR line connected to said inlet connector; and a second SCR line connected to said outlet connector.

15. An automotive SCR system assembly as defined in claim 14, further comprising a flexible cover enclosing said tube of said holder, enclosing said inlet connector, enclosing said outlet connector, enclosing a section of said first SCR line, and enclosing a section of said second SCR line.

16. An automotive SCR system assembly as defined in claim 14, wherein said holder further comprises a quick-connection with an inter-connecting structure to releasably hold the SCR system sensor within said interior of said holder.

17. An automotive SCR system assembly as defined in claim 14, wherein said heating element is a resistance wire wrapped around at least a section of said tube in order to emit heat to said tube.

18. An automotive SCR system assembly as defined in claim 14, wherein said holder further comprises a first quick-connection with an inter-connecting structure to releasably secure said inlet connector within said inlet of said tube, and comprises a second quick-connection with an inter-connecting structure to releasably secure said outlet connector within said outlet of said tube.

19. An automotive selective catalytic reduction (SCR) system sensor holder, the holder comprising:

a tube having an inlet to receive incoming fluid from a first SCR line, having an outlet to lead exiting fluid to a second SCR line, and having a passage between said inlet and said outlet, said inlet having a first opening leading to said passage, and said outlet having a second opening leading to said passage;

a chamber positioned externally of the tube passage, the chamber having an interior accessible to said passage, said interior receiving an SCR system sensor, said chamber having an open bottom open to said passage of said tube in order to receive a portion of the SCR system sensor in said passage such that the portion of the SCR system sensor extends through the open bottom directly into the passage of the tube between the inlet and outlet, said chamber having a third opening leading to said interior; a resistance wire located around at least a section of said tube in order to emit heat to said tube; a first retainer having a portion moveable in said first opening; a second retainer having a portion moveable in said second opening; and a third retainer having a portion moveable in said third opening.

* * * * *